(No Model.)
T. A. EDISON.
ELECTRIC MOTOR.
No. 248,429. Patented Oct. 18, 1881.
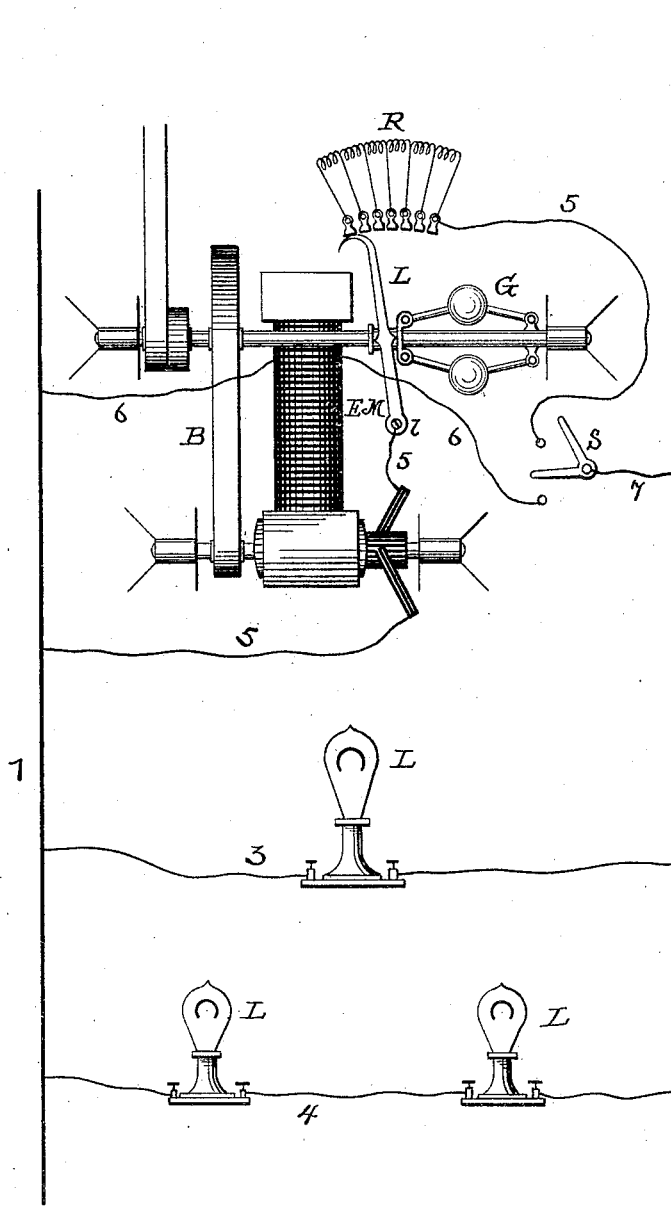
Attest:
D. D. Mott
M. J. Klagett
Inventor:
T. A. Edison.
per
Dyer & Wilber
Attys

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

ELECTRIC MOTOR.

SPECIFICATION forming part of Letters Patent No. 248,429, dated October 18, 1881.

Application filed March 3, 1881. (No model.)

*To all whom it may concern:*

Be it known that I, THOMAS A. EDISON, of Menlo Park, in the county of Middlesex and State of New Jersey, have invented a new and useful Improvement in Electro Motors; and I do hereby declare that the following is a full and exact description of the same, reference being had to the accompanying drawings, and to the letters of reference marked thereon.

In systems which contemplate the distribution and utilization of electricity for various purposes—for instance, for both light and power—it is essential that there be such arrangement that the throwing into or cutting out of circuit of translating devices shall not affect those already in circuit or remaining in circuit. I prefer to attain this result by controlling the generators at the central or supply station, so that just the current needed is constantly supplied. When, however, upon one system there are arranged both lamps and motors, some of the latter requiring many times as much current as a lamp, there is apt, as such motors are placed in circuit, to be a momentary effect upon the lamps, visible in the shape of a jump or flicker or drop, before the motor has reached its proper speed. This is also due to the fact that the motors are of much less resistance than the lamp used. When, however, a motor attains its maximum speed, it gives a counter electro-motive force in its own derived circuit, which has the functions of a wire resistance, and weakens the opposing current in its circuit in the same way as would a wire resistance, and compensates for the lessening of actual wire resistance.

It is known that a motor cannot attain its maximum speed immediately; that an interval of time, often very small, but still an appreciable quantity, elapses before the necessary degree of magnetization is reached, inertia overcome, and the maximum speed attained.

The object of this invention is to prevent any effect upon the lamps; and to that end it consists, in general terms, in combining with a motor devices which, when the motor is placed in circuit, prevent the motor from starting up immediately at full head, causing it to gradually attain its maximum power or speed, and to give the counter electro-motive force which takes the place of wire resistance. This may be accomplished by placing in the armature-circuit a resistance and a pivoted lever, normally closing the circuit to the armature through the entire resistance. This lever is controlled by a governor driven from the engine in such manner that as the speed of the engine increases the governor carries the lever from contact to contact of the resistance, gradually cutting it out. This increase of speed causes an increased counter electro-motive force in the motor-circuit, which increase is always sufficient to compensate for the actual wire resistance cut out of circuit by the same cause. Such an arrangement is shown in the drawings, in which—

1 2 represent the main conductors, on derived circuits to which, 3 4, are placed lamps L L, there being any desired number of circuits and lamps.

E M is an electro-motor, arranged to work in the same system, its armature being a derived circuit, 5, and its field-coils in a derived circuit, 6, both circuits being controlled by a double switch, S, attached to a wire, 7. In the circuit 5 of the armature is a resistance, R, and a lever, L, pivoted at *l*.

G is a centrifugal governor, driven by a belt, B, from the shaft of the armature. The lever L is controlled by the governor, so that when the governor is at rest the lever shall make contact with the resistance in such manner as to include all the resistance in the circuit. Upon closure of circuit through the motor it starts slowly; but as speed is increased the rotation of the governor causes the balls to fly out. The lever L is carried so as to cut out part of the resistance, a correspondingly-increased amount of counter electro-motive force being caused by the quickening of speed, until the motor attains its maximum speed, giving an amount of counter electro-motive force which compensates for the resistance cut out.

I have found that by this method of substituting counter electro-motive force for actual resistance the conditions of the motor-circuit may always be preserved practically unchanged, so far as affecting the lights is concerned, actual resistance and counter electro-motive force being exchanged for each other in rest and motion, and proportionately as the rate of motion. By such an arrangement all sudden effect upon other translating devices is avoided, while the delay in bringing the motor to its maximum is very little, though sufficient to enable the proper compensation to be made.

What I claim is—

The combination, with an electro-motor, of a resistance included in its circuit normally or in a state of rest, and means operated by the motor, and arranged to gradually cut out the resistance as the motor speeds up, and to entirely cut it out when the motor reaches a desired predetermined speed, substantially as set forth.

This specification signed and witnessed this 24th day of February, 1881.

THOS. A. EDISON.

Witnesses:
H. W. SEELY,
S. D. MOTT.